United States Patent
Eguchi et al.

(10) Patent No.: US 7,517,299 B2
(45) Date of Patent: Apr. 14, 2009

(54) TRANSMISSION CONTROL SYSTEM

(75) Inventors: Takahiro Eguchi, Saitama (JP); Naoki Fujishiro, Saitama (JP); Yuichiro Takemori, Saitama (JP); Toshikazu Uneyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 11/541,524

(22) Filed: Oct. 3, 2006

(65) Prior Publication Data
US 2007/0082781 A1  Apr. 12, 2007

(30) Foreign Application Priority Data
Oct. 6, 2005 (JP) ............... P2005-293483

(51) Int. Cl.
*F16H 61/662* (2006.01)
(52) U.S. Cl. .................. 477/44; 477/46; 475/210
(58) Field of Classification Search .......... 475/208, 475/209, 210; 477/44, 46
See application file for complete search history.

(56) References Cited

U.S. PATENT DOCUMENTS

| 5,674,150 A | * | 10/1997 | Morishita et al. | 477/39 |
| 5,713,815 A | * | 2/1998 | Funatsu et al. | 477/46 |
| 5,776,028 A | * | 7/1998 | Matsuda et al. | 477/45 |
| 5,782,719 A | * | 7/1998 | Adachi | 477/46 |

FOREIGN PATENT DOCUMENTS

| JP | 02-003735 A | 1/1990 |
| JP | 03-129162 A | 6/1991 |
| JP | 04-231765 A | 8/1992 |
| JP | 05-060223 A | 3/1993 |
| JP | 09-303550 A | 11/1997 |
| JP | 2000-193081 A | 7/2000 |
| JP | 2003-120721 A | 4/2003 |
| JP | 2004-232711 A | 8/2004 |

* cited by examiner

*Primary Examiner*—Ha D. Ho
(74) *Attorney, Agent, or Firm*—Arent Fox LLP

(57) ABSTRACT

A transmission TM comprises a metal V-belt mechanism 20, which is provided between an engine ENG and driving wheels DRW and transmits a rotational driving force from the engine ENG toward the driving wheels DRW with a speed change, and a forward/reverse switching mechanism 30, which includes a planetary gear train and switches the rotational direction between for a forward drive and for a reverse drive and transmits the rotational driving force received from the engine ENG to the metal V-belt mechanism 20. An engine control unit 60 for the transmission TM, while the rotational direction is set for a reverse drive, changes the ratio of the metal V-belt mechanism 20 in the direction where the vehicle speed increases by a predetermined ratio and controls the torque input from the engine ENG such that the torque being transmitted to the driving wheels DRW achieves approximately the same magnitude as that achieved while the rotational direction is set for a forward drive.

5 Claims, 11 Drawing Sheets

TRANSMISSION CONTROL SYSTEM

FIELD OF THE INVENTION

The present invention relates to a control system for a transmission that comprises a ratio change mechanism, which transmits the output of a driving source to driving wheels with a speed change.

BACKGROUND OF THE INVENTION

As such a transmission that comprises a continuously variable transmission, which transmits the rotational driving force of an engine to driving wheels with a speed change, there is known a transmission that incorporates a single pinion type planetary gear train as a forward/reverse switching mechanism, which is used for switching the driving direction of a vehicle (for example, refer to Japanese Laid-Open Patent Publication No. 2003-120721). For example, the sun gear of the planetary gear train receives the rotational driving force of the engine, and the ring gear is used as the output member for handing the rotational driving force successively to the continuously variable transmission. In the planetary gear train, a forward clutch is used for fixing the sun gear and the ring gear stationary, so that the rotational direction produced thereby corresponds to the forward direction of the vehicle. On the other hand, a reverse brake is used for fixing the carrier, so that the rotational direction produced by the gear train corresponds to the rearward direction of the vehicle.

While the transmission is set in the reverse range, the rotational speed at which the rotational driving force is input from the engine is reduced in the planetary gear train, and the driving force is output at this reduced speed to the continuously variable transmission. In other words, the continuously variable transmission receives an input torque that is much larger than that output by the engine. For restraining the thrust being applied onto the continuously variable transmission against this input torque, an upshifting is executed, and the ignition is retarded for eliminating any abrupt change in the torque until the upshifting is complete.

PROBLEMS TO BE SOLVED BY THE INVENTION

However, for example, if the stroke volume of the engine becomes larger, the torque input from the engine becomes also larger, and the torque put into the continuously variable transmission becomes larger correspondingly. In this case, the number of discs that constitute the reverse brake of the forward/reverse switching mechanism must become larger for acquiring the thrust necessary for the proper functioning of the mechanism against the increased torque input. However, if such a counter-measure is taken, then the friction increased from this increased number of discs, which constitute the reverse brake, can act to reduce fuel efficiency. Another problem is that not only the body of the continuously variable transmission but also the oil pump, which generates the hydraulic pressure, must be made larger and heavier for achieving the necessary thrust.

SUMMARY OF THE INVENTION

For solving such problems, it is an object of the present invention to provide a control system for a transmission, which system enables transmission of necessary torque through a ratio change mechanism (continuously variable transmission) that is not constructed in a large body.

MEANS TO SOLVE THE PROBLEMS

In order to achieve this objective, a control system (for example, the engine control unit 60 described in the following embodiment) according to the present invention is used for a transmission that comprises a ratio change mechanism (for example, the metal V-belt mechanism 20 described in the following embodiment) and a forward/reverse switching mechanism. The ratio change mechanism is provided between an engine and driving wheels and transmits a rotational driving force from the engine to the driving wheels with a speed change, and the forward/reverse switching mechanism is provided between the engine and the ratio change mechanism and transmits the rotational driving force being received from the engine to the ratio change mechanism with a switching of rotational direction between for a forward drive and for a reverse drive. The forward/reverse switching mechanism comprises a planetary gear train, which includes a sun gear element (for example, the sun gear 31 described in the following embodiment), a carrier element (the carrier 33 described in the following embodiment) and a ring gear element (the ring gear 32 described in the following embodiment). In the planetary gear train, the sun gear element is connected to the engine, and the ring gear element is connected to the ratio change mechanism. The forward/reverse switching mechanism further comprises a forward drive clutch and a reverse brake. The forward drive clutch is used for connecting the sun gear element with the ring gear element, so that the rotation received from the engine is output as is to the ratio change mechanism in the rotational direction for a forward drive. The reverse brake is used for fixing the carrier stationary, so that the rotation received from the engine is output to the ratio change mechanism with a speed reduction in the rotational direction for a reverse drive. The control system, while the reverse brake is in engagement, changes the speed ratio of the ratio change mechanism for a speed increase to a predetermined ratio and controls the torque input from the engine such that the driving wheels receive a torque in the same magnitude as they receive while the forward drive clutch, instead, is in engagement.

In the transmission control system according to the present invention, the predetermined ratio is selected as the smallest ratio of a ratio determined from the accelerator opening, a ratio determined from the vehicle speed, and a ratio that enables the ratio change mechanism to operate at a maximum thrust. Here, the ratio determined from the accelerator opening, while the accelerator opening is relatively small, is set as a ratio that makes the ratio change mechanism to increase the rotational speed by an amount approximately equal to the speed reduction caused by the planetary gear train. On the other hand, while the accelerator opening is relatively large, the ratio determined from the accelerator opening is preferably set as a ratio that makes the ratio change mechanism to achieve a driving force approximately equal in magnitude to that achieved while the forward drive clutch, instead, is in engagement.

It is preferable that the transmission further comprise a starting clutch, which is provided between the ratio change mechanism and the driving wheels. The starting clutch is used for connecting the ratio change mechanism to the driving wheels for transmitting the rotational driving force from the ratio change mechanism to the driving wheels or used for disconnecting them to terminate the transmission of the rotational driving force. In the transmission, if the torque transmitted through the starting clutch exceeds a predetermined threshold, then the control system preferably controls the starting clutch to slide. Or, if the torque transmitted through the starting clutch exceeds a predetermined threshold, then the control system preferably cuts the fuel being supplied to the engine.

ADVANTAGEOUS EFFECTS OF THE INVENTION

The control system according to the present invention, which is constructed for a transmission as described above, controls optimally the torque input from the engine to the ratio change mechanism. Therefore, the present invention makes it unnecessary to increase the number of the discs that constitute the reverse brake of the forward/reverse switching mechanism, which measure may be necessary otherwise. As the control system according to the present invention makes the friction that arises during the operation of the transmission smaller, fuel efficiency is improved. According to the present invention, it is possible to reduce the number of parts that constitute the reverse brake, so a cost cut can be realized. Furthermore, the control system according to the present invention makes smaller the thrust required for the continuously variable transmission, so the overall construction of the continuously variable transmission can be miniaturized. Accordingly, the oil pump, which supplies hydraulic oil to the continuously variable transmission, can be also realized in a relatively small body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

MOST PREFERABLE EMBODIMENTS OF THE INVENTION

Figure 1:
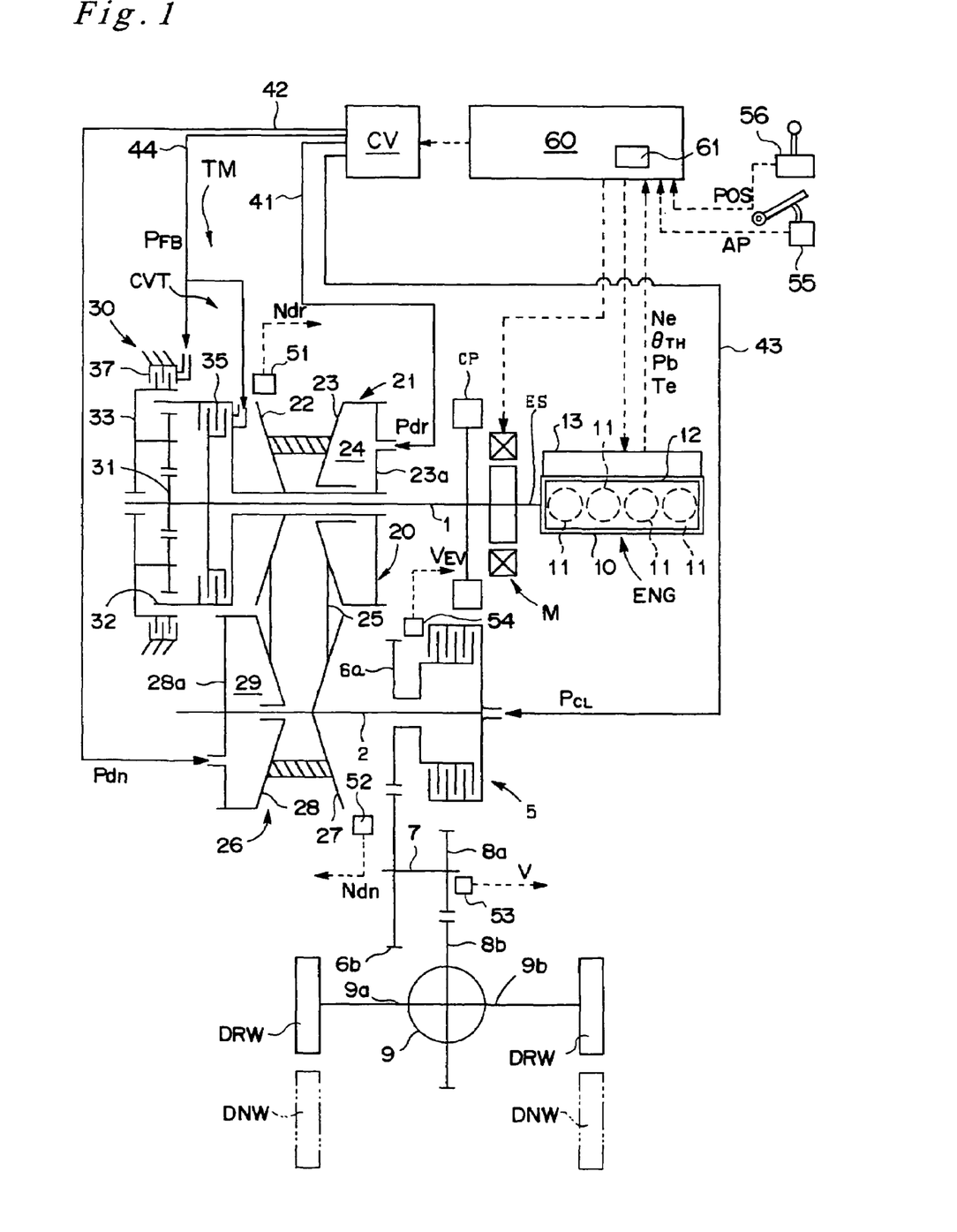
FIG. 1 is a schematic diagram showing the construction of a transmission according to the present invention.

Now, a preferable embodiment is described in reference to these drawings. FIG. 1 shows a transmission TM for a four wheel vehicle, in which a vehicular control system according to the present invention is incorporated. The transmission TM comprises an engine ENG, an electrical motor generator M, and a continuously variable transmission CVT. The electrical motor generator M is disposed on the output shaft Es of the engine ENG while the continuously variable transmission CVT is connected through a coupling mechanism CP to the output shaft Es of the engine ENG. The rotational driving force of the engine ENG is transmitted to driving wheels DRW, so that the vehicle travels on the driving wheels DRW and driven wheels DNW.

The engine ENG is a four cylinder reciprocating engine and has a piston in each of the four cylinder bores 11 formed in a cylinder block 10. The engine E is equipped with a suction and exhaust controller 12, which controls the suction and exhaust for each cylinder bore 11, and equipped with a fuel injection and ignition controller 13, which controls the injection of fuel and the ignition for each cylinder bore 11. The suction and exhaust controller 12 is provided with a throttle valve (not shown), whose operation is controlled electrically by an engine control unit 60, which is described below. The opening θTH of the throttle valve is adjusted for controlling the output of the engine ENG.

The electrical motor generator M assists the driving force of the engine ENG when it is powered by a battery (not shown), which is incorporated in the vehicle. In addition, the electrical motor generator M charges the battery by generating electricity from the rotational drive received from the wheel side while the vehicle is being decelerated (energy recovery). Thus, this transmission TM has a hybrid-type drive source, which comprises the engine ENG and the electrical motor generator M.

The continuously variable transmission CVT comprises a metal V-belt mechanism 20, a forward/reverse switching mechanism 30 and a starting clutch 5. The metal V-belt mechanism 20 is disposed around the input shaft 1 and the countershaft 2 of the transmission, the forward/reverse switching mechanism 30 is disposed over the input shaft 1, and the starting clutch 5 is disposed on the countershaft 2. The input shaft 1 of the continuously variable transmission CVT is connected through the coupling mechanism CP with the output shaft Es of the engine ENG. The metal V-belt mechanism 20 comprises a drive pulley 21, which is disposed rotatable over the input shaft 1, a driven pulley 26, which is fixed on the countershaft 2, and a metal V-belt 25, which is disposed around these pulleys 21 and 26.

The drive pulley 21 comprises a stationary pulley half 22, which is stationary in the axial direction but rotatable with respect to the input shaft 1, and a movable pulley half 23, which is movable axially with respect to the stationary pulley half 22. On the lateral outside of the movable pulley half 23, a drive-pulley cylinder chamber 24 is defined by a cylinder wall 23a, so that a drive pulley control pressure Pdr being supplied through a control valve CV and through an oil passage 41 into the cylinder chamber 24 generates a thrust that shifts the movable pulley half 23 in the axial direction.

The driven pulley 26 comprises a stationary pulley half 27, which is fixed on the countershaft 2, and a movable pulley half 28, which is movable axially with respect to the stationary pulley half 27. On the lateral outside of the movable pulley half 28, a driven-pulley cylinder chamber 29 is defined by a cylinder wall 28a, and a driven pulley control pressure Pdn being supplied through the control valve CV and through an oil passage 42 into the cylinder chamber 29 generates a thrust that shifts the movable pulley half 28 in the axial direction.

In the metal V-belt mechanism 20, the pulley control pressures Pdr and Pdn are controlled by the control valve CV to generate appropriate lateral thrusts, so that the groove widths of the drive and driven pulleys 21 and 26, respectively, will change, adjusting the pitch radii of the respective pulleys for the metal V-belt 25. In this way, the speed change ratio of the transmission is controlled to vary continuously without any step.

The forward/reverse switching mechanism 30 is a single pinion type planetary gear train, which comprises a sun gear 31, a ring gear 32, a carrier 33 and a forward clutch 35. The sun gear 31 is connected to the input shaft 1, and the ring gear 32 is connected to the stationary pulley half 22 of the drive pulley 21. The carrier 33 can be held against rotation by a reverse brake 37, and the forward clutch 35 is operated to connect the sun gear 31 with the ring gear 32. In this mechanism 30, while the forward clutch 35 is in engagement, all the gears 31, 32 and 33 rotate together with the input shaft 1 as a one body, so the drive pulley 21 is driven by the driving force of the engine ENG in the same rotational direction as the input shaft 1 (i.e., in the forward direction of the vehicle). On the other hand, while the reverse brake 37 is in engagement, the carrier 33 is held stationary, so the ring gear 32 rotates in the direction opposite to that of the sun gear 31, and the drive pulley 21 is driven by the driving force of the engine ENG in the direction opposite to that of the input shaft 1 (i.e., in the reverse direction).

The starting clutch 5 is a hydraulic clutch for controlling the transmission of power between the countershaft 2 and the output members of the transmission, i.e., transmission gear trains 6 (6a and 6b) and 8 (8a and 8b). While the starting clutch 5 is in engagement, the power from the countershaft 2 is transmitted to the transmission gear trains 6 and 8 at a ratio that corresponds to the engaging condition (engaging force) of the starting clutch 5. The power of the engine ENG, after undergoing the speed ratio change by the metal V-belt mechanism 20, is transmitted through the transmission gear trains 6 and 8 to the differential mechanism 9, where it is divided and then transmitted to the right and left axle shafts 9a and 9b and to the driving wheels DRW. While the starting clutch 5 is in disengagement, this transmission is not possible.

In the continuously variable transmission CVT, which is constructed as described above, the pulley control pressures Pdr and Pdn being supplied through the oil passages 41 and 42, respectively, from the control valve CV are used for the speed ratio change control of the transmission. The forward/reverse control pressure PFB being supplied to the forward clutch 35 and to the reverse brake 37 through an oil passage 44 from the control valve CV is used for the forward/reverse switching control of the transmission. In addition, the clutch control pressure PCL being supplied from the control valve CV through an oil passage 43 is used for the engaging control of the starting clutch. The control valve CV comprises a plurality of electromagnetically controlled valves, each of which is equipped with a solenoid. The operation of the control valve CV itself is controlled by means of magnetizing signals that are applied to these solenoids, respectively.

In the transmission TM, various sensors are provided for detecting the conditions of the vehicle. For example, as shown in FIG. 1, a drive pulley rotational speed sensor 51 is provided in the proximity of the drive pulley 21 for detecting the rotational speed Ndr of the drive pulley 21; a driven pulley rotational speed sensor 52 is provided in the proximity of the driven pulley 26 for detecting the rotational speed Ndn of the driven pulley 26; a vehicle speed sensor 53 is provided in the proximity of an idler shaft 7, which constitutes the transmission gear trains 6 and 8, for detecting the vehicle speed V; a starting clutch output sensor 54 is provided for detecting the rotational speed VEV of the output member of the starting clutch 5; and an accelerator sensor 55 is provided for detecting the operational extent AP of the accelerator pedal (accelerator opening). In addition, the above mentioned engine control unit 60 controls electrically the operations of the engine ENG and the continuously variable transmission CVT, respectively.

The engine control unit 60 calculates a value for each of the engine rotational speed Ne, the opening θth of the throttle valve, and the suction pressure Pb on the basis of detection signals received from sensors provided at appropriate parts of the engine ENG and from the pulley rotational speed sensors 51 and 52, the vehicle speed sensor 53, the starting clutch output sensor 54 and the accelerator sensor 55. Furthermore, the engine control unit 60 controls the power of the engine ENG by sending control signals for adjusting the opening θth of the throttle valve. In addition, the engine control unit 60 executes a driving force assist control in which the electrical motor generator M is used for acquiring an additional driving force. The engine control unit 60 controls the operation of the electrical motor generator M by sending control signals.

Furthermore, the engine control unit 60 calculates the clutch control pressure PCL from each value input and controls the operation of the control valve CV by sending magnetizing signals to the control valve CV such that the calculated clutch control pressure PCL is achieved and supplied to the starting clutch 5. In this way, the engine control unit 60 controls the engaging force of the starting clutch 5. In similar ways, the engine control unit 60 also controls the pulley control pressures Pdr and Pdn and the forward/reverse control pressure PFB by controlling the operation of the control valve CV. For the execution of these controls, the engine control unit 60 is equipped with memory means 61, where maps used in the calculations for these control pressures are stored.

Now, FIGS. 2~FIG. 7 are referred to, for describing a torque-on-demand control, which is executed for controlling the torque of the engine ENG while the vehicle is set in the reverse mode, with the reverse brake 37 being in engagement. The execution of this process is repeated periodically at predetermined intervals (for example, 10 milliseconds) while the shift lever 56 is set in the reverse range.

Figure 2:
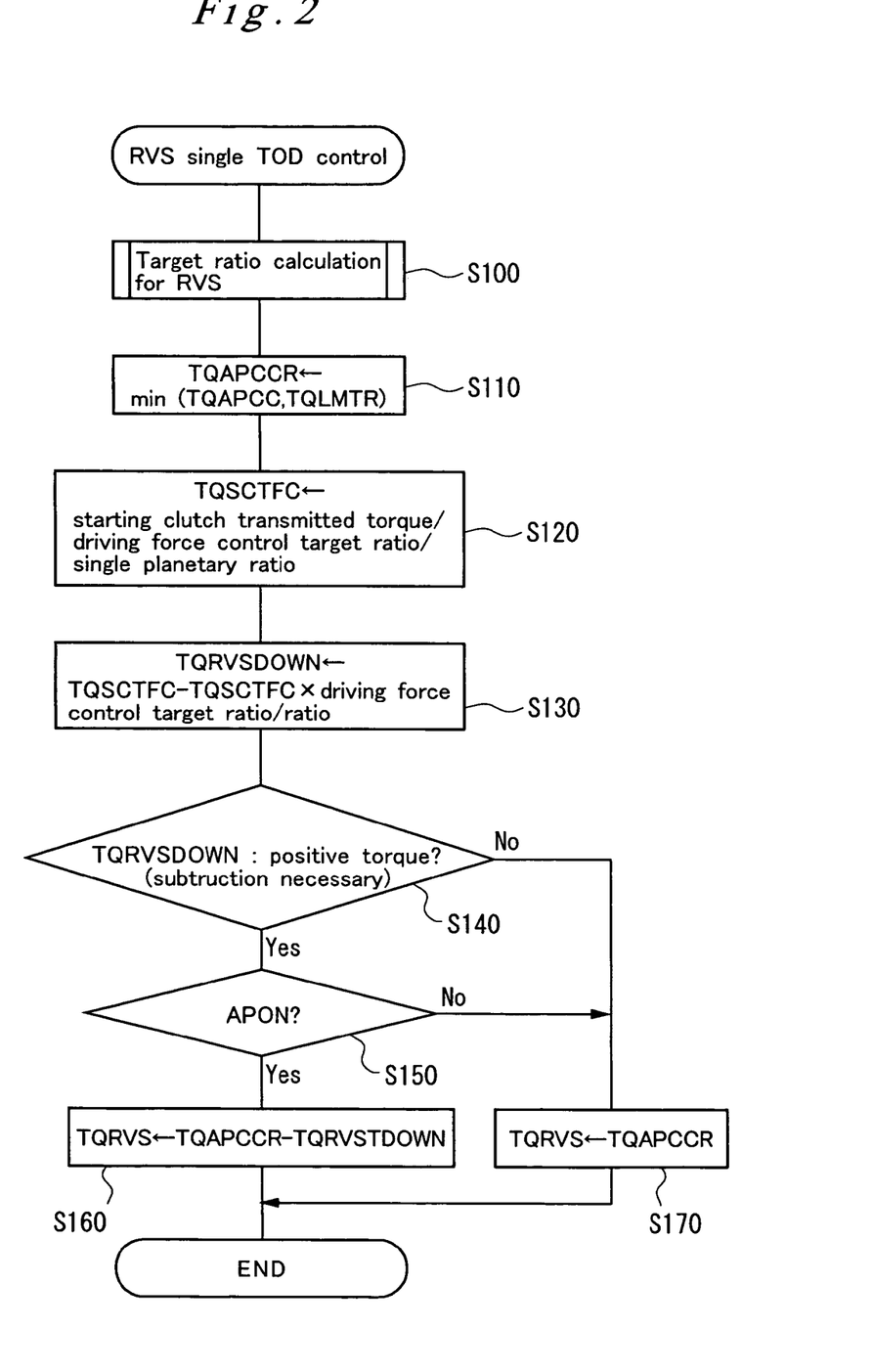
FIG. 2 is a flowchart showing steps of a torque-on-demand control.
Figure 3:
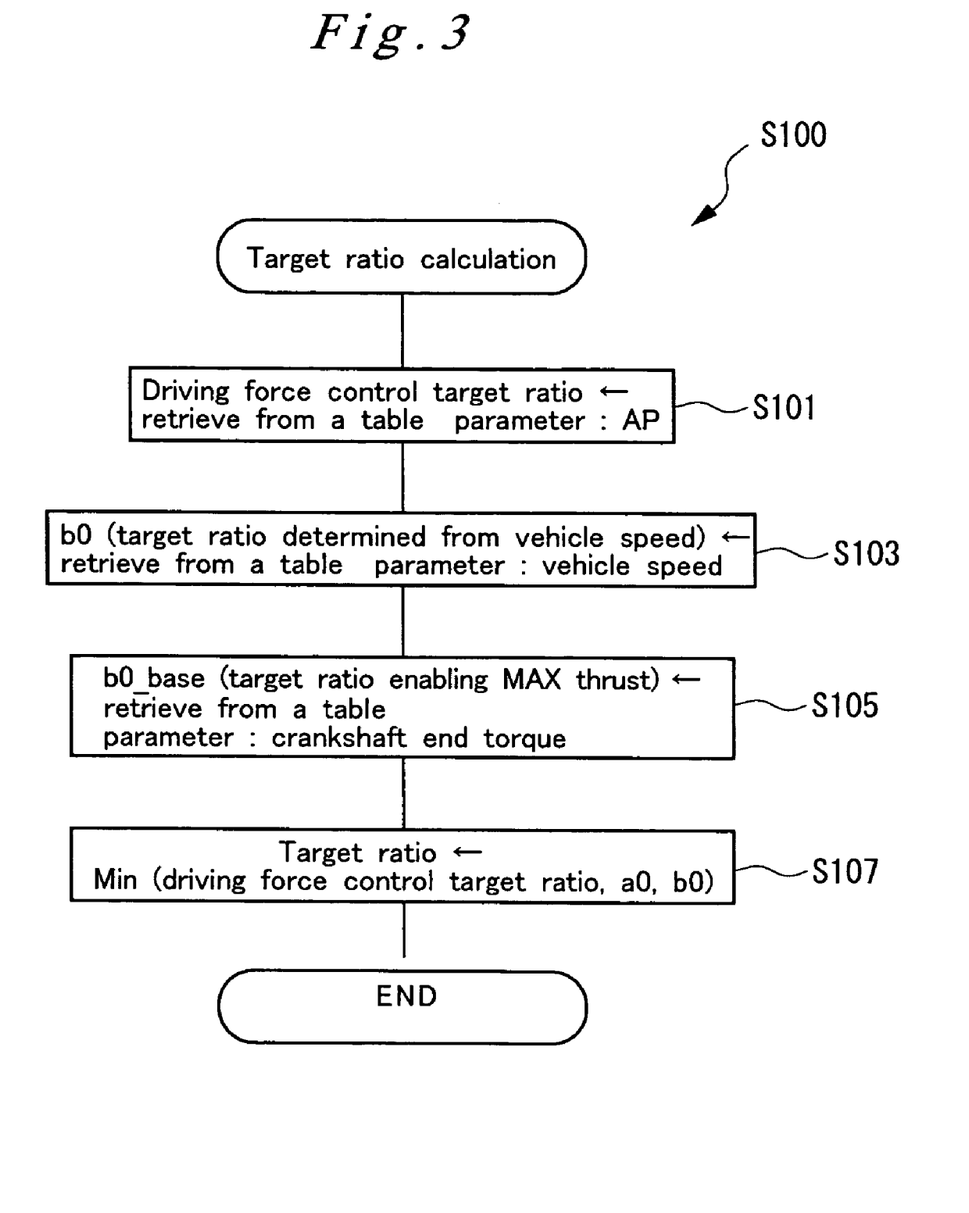
FIG. 3 is a flowchart showing steps of a target ratio calculation.

In the torque-on-demand control, a target ratio Ro is calculated for the continuously variable transmission CVT at step S100. This calculation of the target ratio Ro at step S100 actually comprises the following steps: step S101 for calculating a target ratio for controlling the driving force in correspondence to the operational extent AP of the accelerator, step S103 for calculating a target ratio in correspondence to the vehicle speed V, step S105 for calculating a target ratio that can transmit a maximum thrust that corresponds to the torque at the end of the crankshaft, and step S107 for selecting a target ratio from these ratio calculated by the preceding steps.

Figure 4:
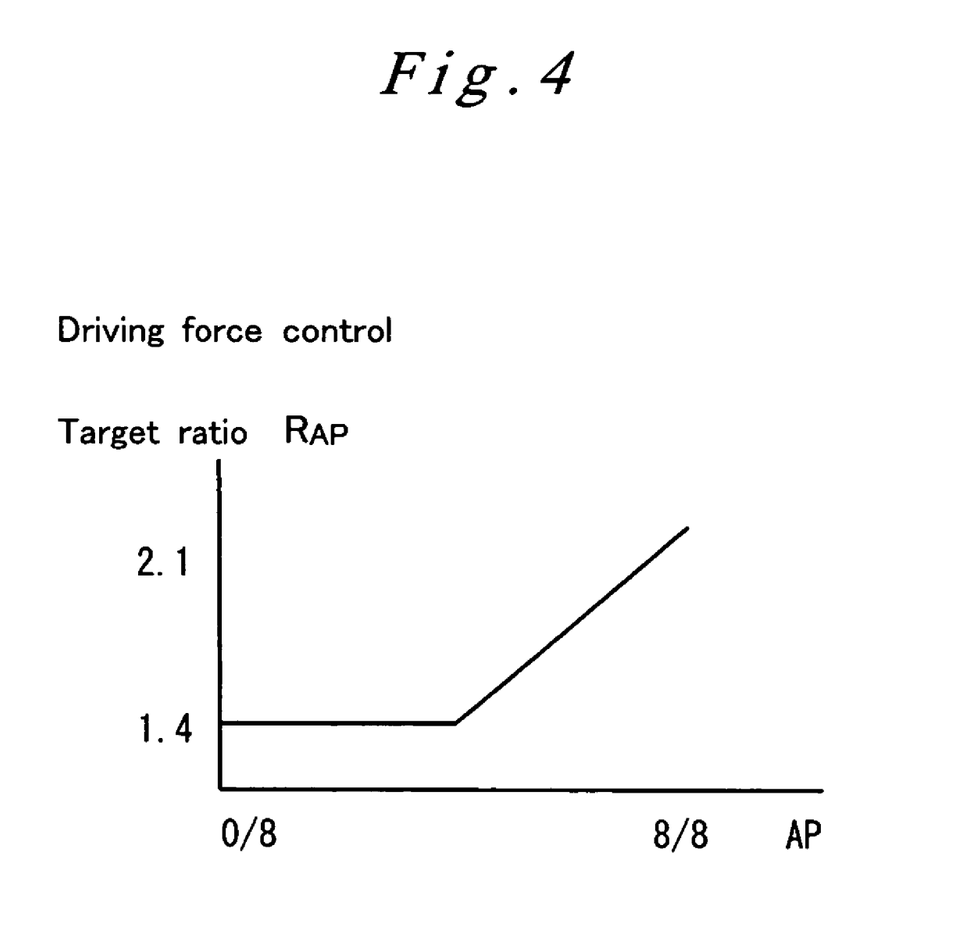
FIG. 4 is a graph showing the relation between the opening of the accelerator and the target ratio for controlling the driving force.

At step S101, where the target ratio for controlling the driving force is calculated, the operational extent AP of the accelerator detected by the accelerator sensor 55 is used as a parameter for retrieving a value for the driving force controlling target ratio RAP, which corresponds to the accelerator's operational extent AP, from a map that is stored in the memory means 61 and describes the relation shown in FIG. 4. This map describes the relation between these two parameters as follows: for smaller values of the operational extent AP of the accelerator pedal, overall values of the driving force controlling target ratio RAP are set almost equal to those for the forward drive, with an emphasis on drivability. In other words, the ratio is so determined that the continuously variable transmission CVT compensates for the deceleration caused by the planetary gear train, which constitutes the forward/reverse switching mechanism 30. Therefore, the driving force controlling target ratio RAP keeps a constant value until the accelerator's operational extent AP reaches a predetermined value as shown in the graph. If a lower start-up sensitivity is desired, then the speed ratio can be set at a higher ratio (more than to compensate for the speed loss by the planetary gear train). On the other hand, after the accelerator's operational extent AP has passed the predetermined value, the driving force controlling target ratio RAP increases correspondingly with the accelerator's operational extent AP, for responding to the demand for an additional driving force. In this case, the ratio is set to achieve a driving force in the same magnitude as for the forward drive, including the consideration of the deceleration by the planetary gear train.

Figure 5:
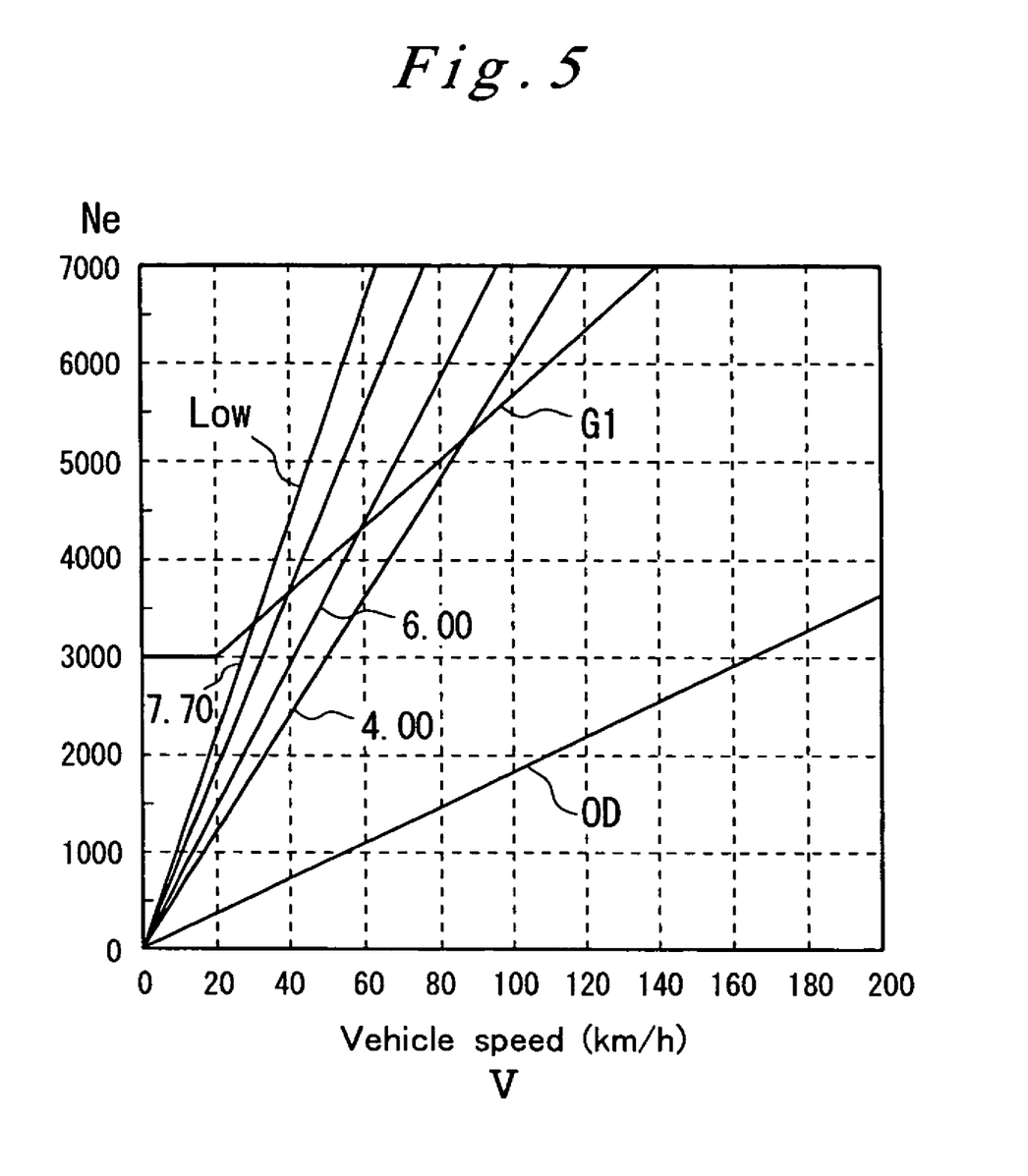
FIG. 5 is a graph showing the relations between the vehicle speed and the rotational speed of the engine at target ratios that correspond to various vehicle speeds.

At step S103, where the target ratio is calculated in correspondence to the vehicle speed, the vehicle speed V detected by the vehicle speed sensor 53 is used as a parameter for retrieving a value for the target ratio a0 that corresponds to the vehicle speed V, from another map that is stored in the memory means 61 and describes the relation shown in the graph on FIG. 5. The line G1 in the graph describes the relation between the engine rotational speed Ne and the vehicle speed V, and the ratio a0, which realizes the vehicle speed V against the engine rotational speed Ne, is stored as a map. The graph includes the relations between the engine rotational speed Ne and the vehicle speed V at the various driving force controlling target ratios RAP (i.e., at Low, 7.70, 6.00, 4.00, and OD), which are discussed above, as reference.

Figure 6:
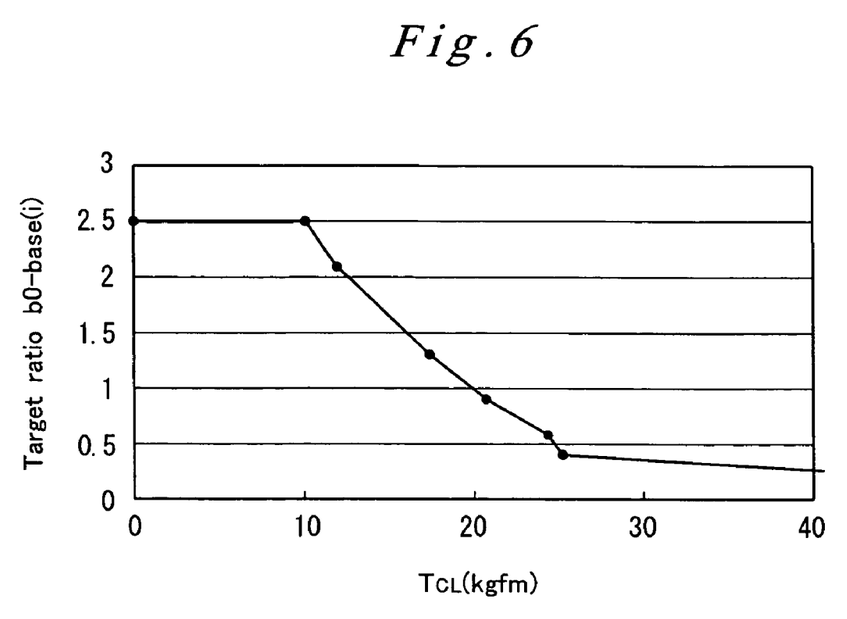
FIG. 6 is a graph showing the relation between the torque at the end of the crank shaft and the target ratio at the maximum thrust of the continuously variable transmission.

At step S105, where the target ratio is calculated for transmitting a maximum thrust, the torque TCL at the end of the crankshaft is used as a parameter for retrieving a value for the target ratio b0_base that enables the continuously variable transmission CVT to transmit a maximum thrust, from another map that is stored in the memory means 61 and describes the relation shown in FIG. 6. In this case, the crankshaft end torque TCL is determined or retrieved from the relation between the engine rotational speed Ne and the suction pressure Pb, which relation is predetermined and described in another map.

At step S107, where the target ratio Ro is determined, the target ratio that is the lowest among the target ratios RAP, a0 and b0_base is selected as the target ratio Ro. In response to this determination, the engine control unit 60 sends magnetizing signals to the control valve CV and controls the drive and driven pulley control pressures Pdr and Pdn, so that the continuously variable transmission CVT achieves the target ratio Ro, which has been just determined.

After the calculation of the target ratio Ro, a determination is made at step S110 for a torque base TQAPCCR required at the crankshaft end for the reverse drive range. The crankshaft end torque base TQAPCCR required for the reverse drive is a minimum value selected by the comparison between the crankshaft end torque base TQAPCC (set in a map), which is calculated from the accelerator's operational extent AP, and the allowable torque TQLMTR of the reverse brake 37 (a value characteristic to the reverse brake 37, for example, 105 Nm).

Then, the crankshaft end starting clutch transmitted torque TQSCTFC, which is equivalent to that set for the forward drive range, is calculated at step S120 by the following equation (1).

$$TQSCTFC = TSC/RAP/RSP \quad (1)$$

wherein TSC: starting clutch transmitted torque
RAP: driving force controlling target ratio
RSP: single planetary ratio.

Figure 7A:
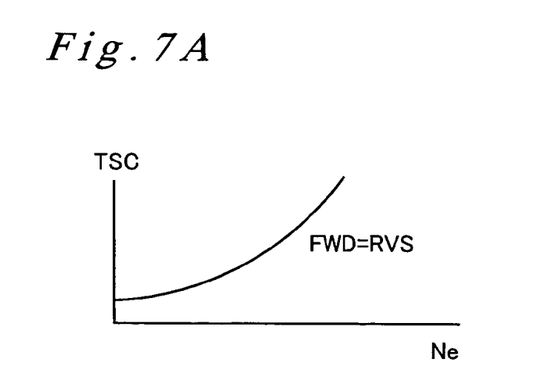
FIGS. 7A and 7B are diagrams describing steps of a calculation for a torque reduction, which is to be executed for the vehicle driving rearward.

Here, the starting clutch transmitted torque TSC is set such that the clutch transmitted torque on the leg shaft (the torque output to the driving wheels DRW) becomes equal both for the forward drive and for the reverse drive. The engine rotational speed Ne is used as a parameter for retrieving a value for the starting clutch transmitted torque TSC from a map that is stored in the memory means 61 and describes the relation between the engine rotational speed Ne and the starting clutch transmitted torque TSC as shown in FIG. 7A The driving force controlling target ratio RAP has been calculated at step S101, and the single planetary ratio RSP is the ratio set by the engagement of the reverse brake 37 for the single pinion type planetary gear train, which constitutes the forward/reverse switching mechanism 30.

Figure 7B:
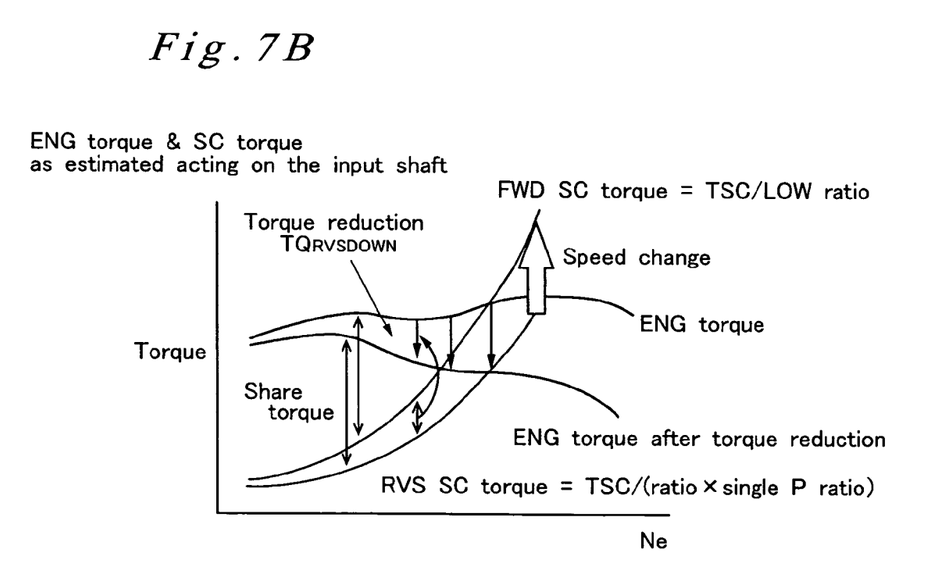

From the forward drive range equivalent crankshaft end starting clutch transmitted torque TQSCTFC, which has been calculated as described above, a torque reduction TQRVSDOWN for the reverse drive is determined at step S130 by the calculation with the following equation (2). Here, the reverse drive torque reduction TQRVSDOWN is determined such that the spare torque (=the engine torque−the crankshaft end starting toque) at the crankshaft end becomes equal both for the forward drive range and for the reverse drive range and that the rate at which the engine rotational speed Ne increases becomes equal both for the forward drive range and for the reverse drive range as shown in FIG. 7B. Therefore, the reverse drive torque reduction TQRVSDOWN is represented as the difference by the subtraction of the crankshaft end starting clutch transmitted torque for the reverse drive range from the crankshaft end starting clutch transmitted torque for the forward drive range.

In this case, the crankshaft end starting clutch transmitted torque for the forward drive range is the value or quotient of the division of the starting clutch transmitted torque TSC by the ratio for the forward drive range (LOW range). The crankshaft end starting clutch transmitted torque for the reverse drive range is the value or quotient of the division of the starting clutch transmitted torque TSC by the product of the real ratio R multiplied by the single planetary ratio RSP. From these values, the following equation (2) is attained.

$$TQRVSDOWN = TQSCTFC - TQSCTFC \times RAP/R \quad (2)$$

Here, R represents the real ratio R that is the actual ratio of the continuously variable transmission CVT, and it is calculated from the rotational speeds Ndr and Ndn of the pulleys, which are detected, respectively, by the drive and driven pulley rotational speed sensors 51 and 52.

After the calculation of the reverse drive torque reduction TQRVSDOWN, a determination is made at step S140 whether it is necessary to control the operation of the engine ENG to reduce its torque or not. In other words, it is determined whether the reverse drive torque reduction TQRVSDOWN is a positive torque or not. If the reverse drive torque reduction TQRVSDOWN is a positive torque, then another determination is made at step S150 whether or not the accelerator pedal is pressed or operated, from the accelerator's operational extent AP, which is a detection signal received from the accelerator sensor 55. If the accelerator pedal is being pressed, then a reverse drive crankshaft end required torque TQRVS is calculated by the following equation (3) at step S160. This equation (3) functions for making the difference of the subtraction of the reverse drive torque reduction TQRVSDOWN from the reverse drive crankshaft end required torque base TQAPCCR as the reverse drive crankshaft end required torque TQRVS.

$$TQRVS = TQAPCCR - TQRVSDOWN \quad (3)$$

On the other hand, if the result of the determination at step S140 is that the reverse drive torque reduction TQRVSDOWN is zero or smaller, or if the result of the determination at step S150 is that the accelerator pedal is not pressed, then no torque reduction is necessary. In this case, the reverse drive crankshaft end required torque base TQAPCCR, which is calculated at step S110, is set as the reverse drive crankshaft end required torque TQRVS at step S170.

After the determination of the reverse drive crankshaft end required torque TQRVS, the engine control unit 60 controls the operation of the engine ENG (the suction and exhaust controller 12 and the fuel injection and ignition controller 13) to achieve this torque by the engine ENG.

As described above, while the reverse drive range is selected, the ratio of the continuously variable transmission CVT is determined in correspondence to the accelerator's operational extent AP and to the vehicle speed V, and the torque input to the continuously variable transmission CVT is limited by the on-demand control, which controls the torque in correspondence to, for example, the condition of the engine ENG. As a result, the torque input to the continuously variable transmission CVT is controlled within an optimal range. Therefore, in this design, it is not necessary to increase the number of discs that constitute the reverse brake 37 of the forward/reverse switching mechanism 30, which may otherwise be necessary. In addition, as this design involves less friction in the operation, fuel efficiency can be improved. Because the number of parts for the reverse brake 37 can be reduced, it is possible to reduce the manufacturing cost. Furthermore, as the thrust required for the continuously variable transmission CVT is smaller than otherwise, it is possible to miniaturize the overall construction of the continuously variable transmission CVT, so the oil pump, which is used for supplying the hydraulic pressure to this mechanism, does not need to be large.

In the forward/reverse switching mechanism 30, which uses a single pinion type planetary gear train, while the reverse drive range is selected, the rotational speed is reduced by the planetary gear train, so the torque amplified by the planetary gear train is transmitted to the continuously variable transmission CVT. In this condition, the above described torque-on-demand control limits the torque input to the continuously variable transmission CVT but allows the transmission of a necessary torque (equivalent to the driving force realized for the forward drive range). In addition, the continuously variable transmission CVT allows ratio changes while the vehicle is driving in the reverse drive range, so this enables the vehicle to achieve any speed required for driving rearward.

By the way, even while the torque input to the continuously variable transmission CVT is being limited by the torque-on-demand control, there is a possibility that the continuously variable transmission CVT may receive an excessive torque, which exceeds the control, for example, because the accelerator pedal is being pressed consistently. However, the engine control unit 60 according to the present invention performs simultaneously, in addition to the torque-on-demand control, a starting clutch control and a fuel cut request control for limiting the torque at the crankshaft end, which controls are described below. The executions of these starting clutch control and fuel cut request control are also repeated at predetermined intervals (for example, 10 msec.).

Figure 8:
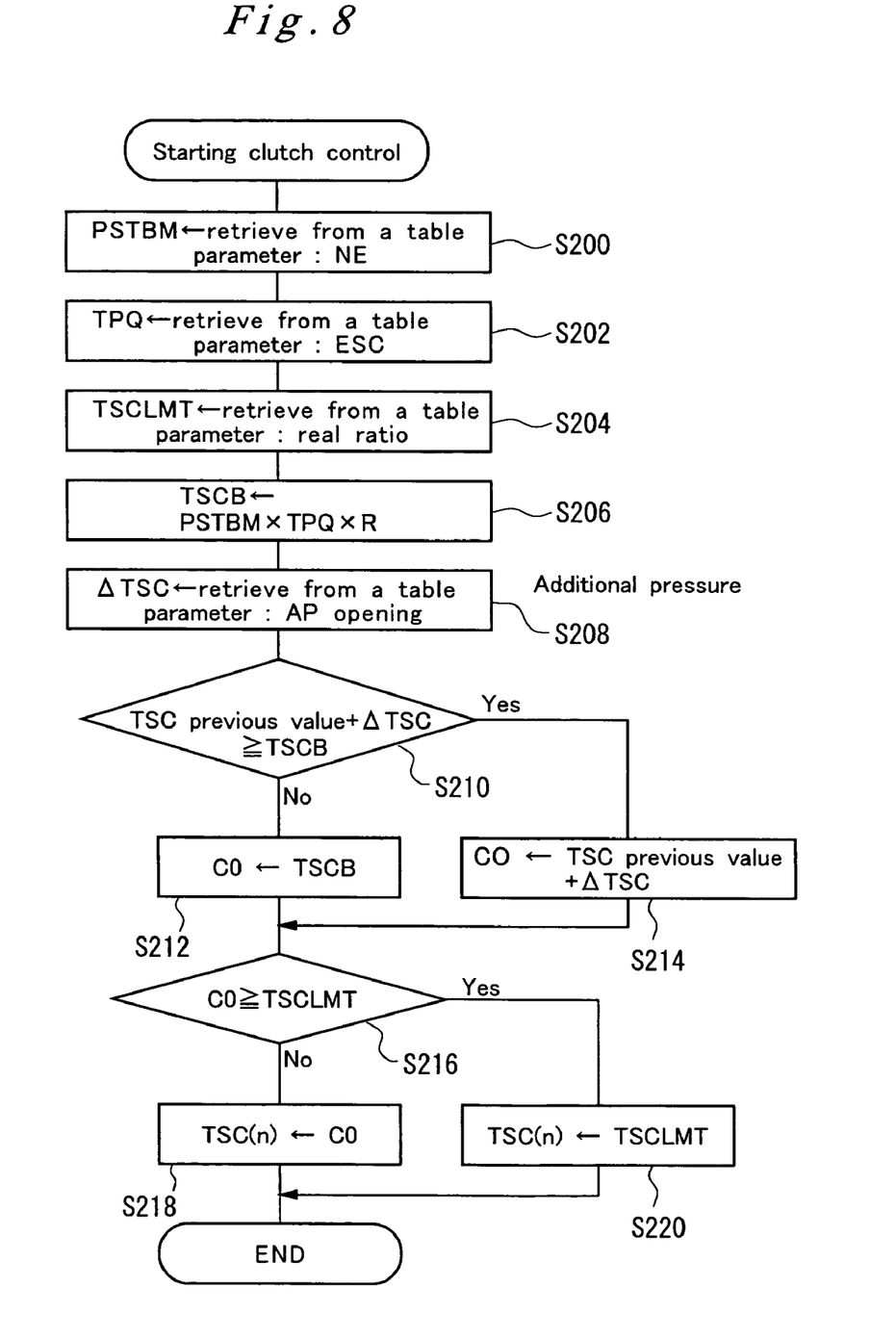
FIG. 8 is a flowchart showing steps of a starting clutch control.
Figure 9A:
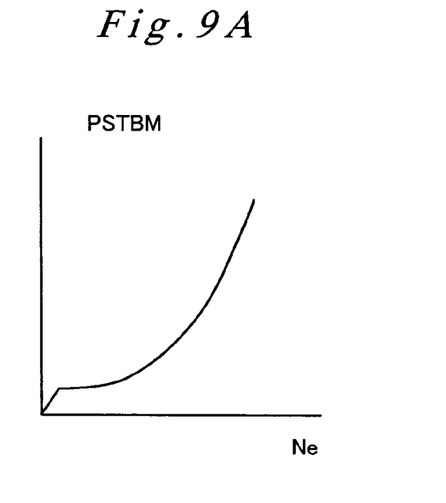
FIGS. 9A and 9B are graphs showing the relations between various coefficients used in the starting clutch control, with FIG. 9A showing the relation between the rotational speed of the engine and the coefficient for the torque transmitted through the starting clutch and FIG. 9B showing the relation between the slippage of the starting clutch and the fudge factor for the slippage.
Figure 9B:
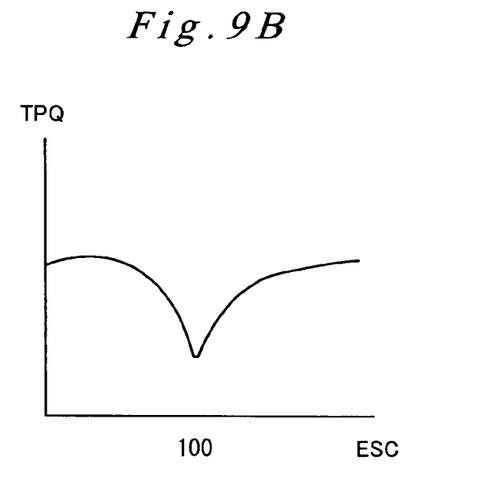

First, the starting clutch control is described in reference to FIG. 8 and FIG. 9. In the starting clutch control, the rotational speed Ne of the engine ENG is used as a parameter for retrieving a value for the starting clutch transmitted torque coefficient PSTBM that corresponds to the engine rotational speed Ne from a map that is stored in the memory means 61 and describes the relation shown in FIG. 9A at step S200. Then, the slippage ESC of the starting clutch 5 is calculated from the rotational speed Ndn of the driven pulley (the rotational speed on the input side of the starting clutch 5) and the rotational speed VEV on the output side of the starting clutch 5, which are detected by the driven pulley rotational speed sensor 52 and the starting clutch output sensor 54, respectively. The slippage ESC is then used as a parameter for retrieving a value for the slippage correction coefficient TPQ that corresponds to the slippage ESC, from another map that in stored in the memory means 61 and describes the relation shown in FIG. 9B, at step S202. Furthermore, the real ratio R of the continuously variable transmission CVT is used as a parameter for retrieving a value for the starting clutch transmitted torque limit TSCLMT that corresponds to the real ratio R, from another map that is stored in memory means 61, at step S204. These values are used in the following equation (4), which calculates a starting clutch toque base value TSCB at step S206.

$$TSCB = PSTBM \times TPQ \times R \quad (4)$$

Then, the accelerator's operational extent AP, which is detected by the accelerator sensor 55, is used as a parameter for retrieving a value for the additional pressure ΔTSC that corresponds to the accelerator's operational extent AP, from a map that is stored in the memory means 61, at step S208. A determination is made at step S210 whether the value or sum of the additional pressure ΔTSC added to the starting clutch transmitted torque TSC(n−1) that was calculated in the previous execution of this process is equal to or higher than the starting clutch toque base value TSCB or not. If the result of the determination at step S210 is that this value is lower than the starting clutch toque base value TSCB, then the starting clutch toque base value TSCB is set as a judgement value C0 at step S212. If the result at step S210 is equal to or higher than the starting clutch toque base value TSCB, the value or sum of the additional pressure ΔTSC added to the starting clutch transmitted torque TSC(n−1) that was calculated in the previous execution of this process is set as the judgement value C0 at step S214.

Finally, a determination is made at step S216 whether or not the judgement value C0 is equal to or higher than the starting clutch transmitted torque limit TSCLMT, which is described above. If it is lower than this limit TSCLMT, then the judgement value C0 is set as the starting clutch transmitted torque TSC(n) in the present execution of the process at step S218. On the other hand, if the judgement value C0 is equal to or higher than the limit TSCLMT, then the limit TSCLMT is set as the starting clutch transmitted torque TSC(n) in the present execution of the process at step S220. The engine control unit 60 controls the operation of the starting clutch 5 for achieving the starting clutch transmitted torque TSC(n), which has been calculated as described above. As a result, even if an excessive torque occur, the starting clutch 5 can slide and absorb the energy, reducing the torque that has been input to the continuously variable transmission CVT.

Figure 10:
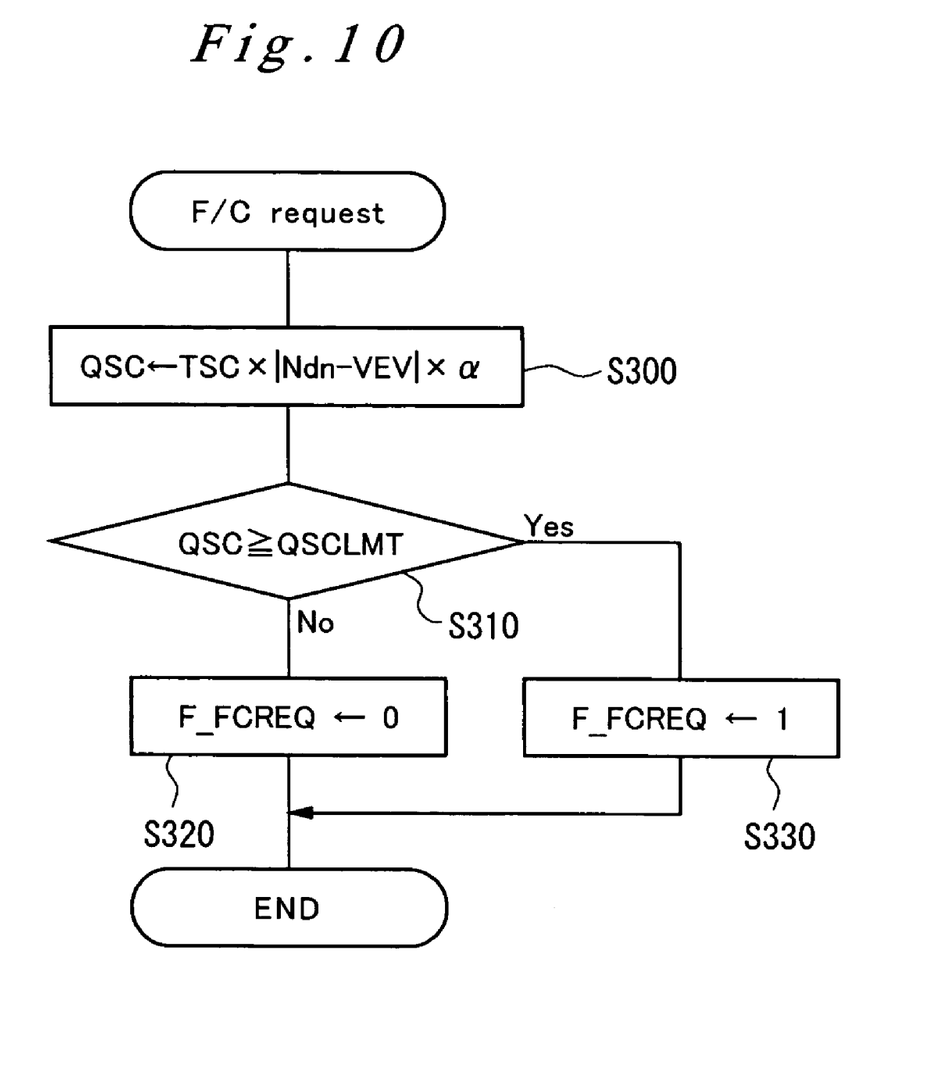
FIG. 10 is a flowchart showing steps of a fuel cut request control.

Now, turning to the fuel cut request control, as shown in FIG. 10, this control, at first, at step S300, calculates a starting clutch absorbed power QSC from the starting clutch transmitted torque TSC and the rotational speed Ndn of the driven pulley and the rotational speed VEV on the output side of the starting clutch 5, which are detected by the driven pulley rotational speed sensor 52 and the starting clutch output sensor 54, by the following equation (5).

$$QSC = TSC \times |Ndn - VEV| \times \alpha \tag{5}$$

Here, $\alpha$: coefficient.

The starting clutch absorbed power QSC can be integrated for calculating the energy (quantity of heat) absorbed at the starting clutch 5, and a determination is made at step S310 whether or not the calculated starting clutch absorbed power QSC is equal to or higher than an allowable value QSCLMT. If the starting clutch absorbed power QSC is lower than the allowable value QSCLMT, then a fuel cut request F_FCREQ is set to "0" for turning off the fuel cut request at step S320. On the other hand, if the starting clutch absorbed power QSC is equal to or higher than the allowable value QSCLMT, then the fuel cut request F_FCREQ is set to "1" for turning on the fuel cut request at step S330. By the way, the allowable value QSCLMT has an upper limit and a lower limit. At step S310, the upper limit is used for the determination whether or not the starting clutch absorbed power QSC is equal to or higher than the allowable value QSCLMT, and the lower limit is used for the determination whether or not the starting clutch absorbed power QSC is lower than the allowable value QSCLMT.

With the fuel cut request F_FCREQ, which is set in this way, the engine control unit 60 controls the fuel injection and ignition controller 13 to stop the fuel injection to the engine ENG in accordance to the fuel cut request F_FCREQ. As a result, the engine output torque decreases, thus reducing the torque input to the continuously variable transmission CVT.

Figure 11:
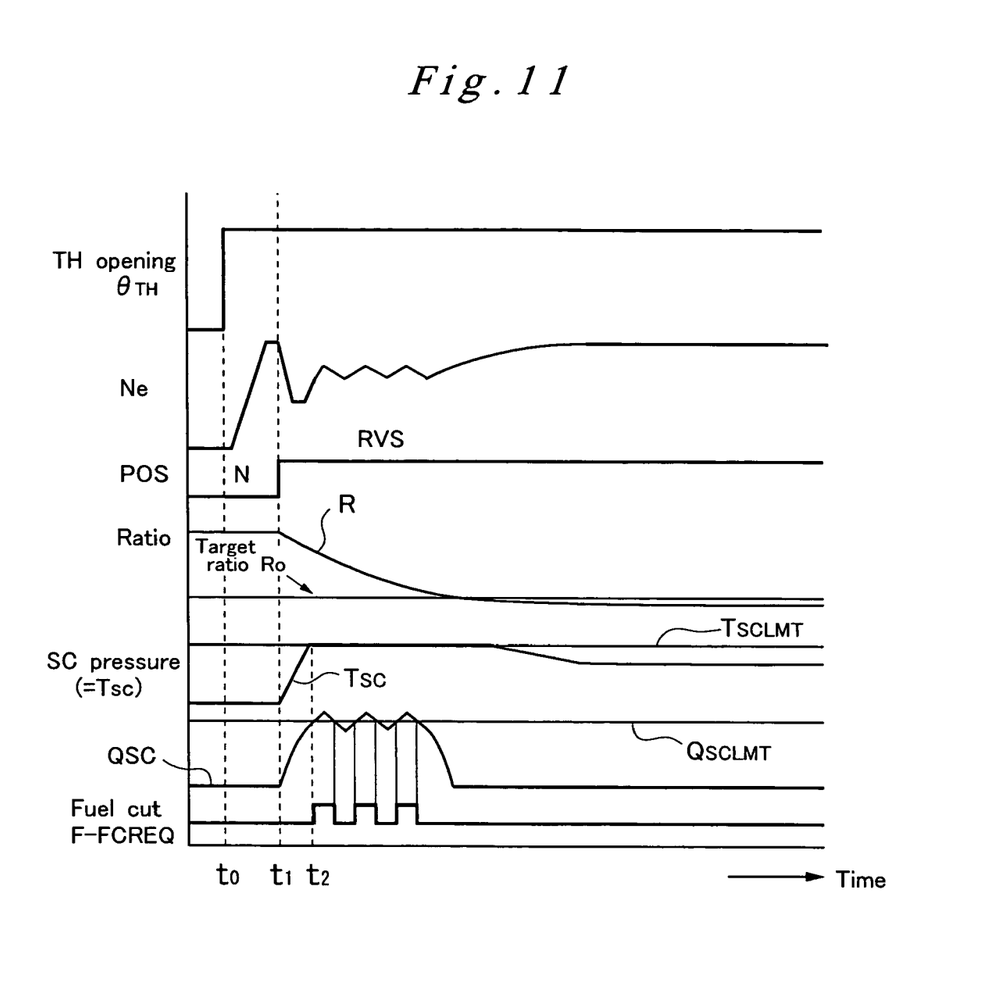
FIG. 11 is a diagram describing changes in the speed ratio and the torque transmitted through the starting clutch, which are effected by a control executed when the reverse range is selected while the engine is operating at a high rotational speed.

Now, in reference to FIG. 11, the torque-on-demand control, the starting clutch control and the fuel cut request control are described for a case where the drive range POS, which is selected by the shift lever 56, is shifted from the neutral (N) to the reverse drive range (R) while the engine ENG is operating at a high rotational speed. In the neutral (N range), the accelerator pedal is pressed at time t0, and the opening θTH of the throttle valve increases with the engine rotational speed Ne increasing correspondingly. While the engine rotational speed Ne is increasing, the drive range POS is switched to the reverse drive range (R range) at time t1. In response, the real ratio R is brought gradually closer to the target ratio Ro, and the starting clutch transmitted torque TSC of the starting clutch 5 is increased for transmitting the power to the driving wheels DRW. However, when the starting clutch transmitted torque TSC reaches the limit TSCLMT at time t2, it will not increase any more. At this moment, the starting clutch 5 is sliding, so the starting clutch absorbed power QSC at the starting clutch 5 increases. When the starting clutch absorbed power QSC increases beyond the allowable value QSCLMT, the fuel is cut.

While the starting clutch 5 is sliding, the torque input to the continuously variable transmission CVT is reduced by cutting the fuel. As a result, the ratio R of the continuously variable transmission CVT is brought to the target ratio Ro for the reverse drive range, which is selected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2005-293483 filed on Oct. 6, 2005, which is incorporated herein by reference.

What is claimed is:

1. A control system for a transmission comprising:
   a ratio change mechanism, which is provided between an engine and driving wheels and which transmits a rotational driving force from said engine to said driving wheels with a speed change, and
   a forward/reverse switching mechanism, which is provided between said engine and said ratio change mechanism and which transmits said rotational driving force being received from said engine to said ratio change mechanism with a switching of rotational direction between for a forward drive and for a reverse drive; and
   said forward/reverse switching mechanism comprising:
   a planetary gear train, which includes a sun gear element, a carrier element and a ring gear element, said sun gear element being connected to said engine, and said ring gear element being connected to said ratio change mechanism,
   a forward drive clutch, which connects said sun gear element and said ring gear element, so that the rotation received from said engine is output as is to said ratio change mechanism in said rotational direction for a forward drive, and
   a reverse brake, which fixes said carrier element stationary, so that the rotation received from said engine is output to said ratio change mechanism with a speed reduction in said rotational direction for a reverse drive;
   wherein:
   while said reverse brake is in engagement, a speed ratio of said ratio change mechanism is changed for a speed increase to a predetermined ratio; and
   while said reverse brake is in engagement, a torque input from said engine is controlled such that said driving wheels receive a torque in a same magnitude as they receive while said forward drive clutch, instead, is in engagement.

2. The control system as set forth in claim 1, wherein:
   said predetermined ratio is selected as a smallest ratio of a ratio determined from an accelerator opening, a ratio determined from a vehicle speed, and a ratio that enables said ratio change mechanism to transmit a maximum thrust.

3. The control system as set forth in claim 2, wherein:
   while said accelerator opening is relatively small, said ratio determined from said accelerator opening is set as a ratio that makes said ratio change mechanism to increase the rotational speed by an amount approximately equal to a speed reduction caused by said planetary gear train; and
   while said accelerator opening is relatively large, said ratio determined from said accelerator opening is set as a ratio that makes said ratio change mechanism to achieve a driving force approximately equal to that achieved while said forward drive clutch, instead, is in engagement.

4. The control system as set forth in any of claims 1, 2 and 3, wherein:

said transmission further comprises a starting clutch, which is provided between said ratio change mechanism and said driving wheels and which connects said ratio change mechanism to said driving wheels for transmitting the rotational driving force from said ratio change mechanism to said driving wheels or disconnects them for terminating the transmission of the rotational driving force; and if a torque transmitted through said starting clutch exceeds a predetermined threshold, then said starting clutch is controlled to slide.

5. The control system as set forth in any of claims 1, 2 and 3, wherein:

said transmission further comprises a starting clutch, which is provided between said ratio change mechanism and said driving wheels and which connects said ratio change mechanism to said driving wheels for transmitting the rotational driving force from said ratio change mechanism to said driving wheels or disconnects them for terminating the transmission of the rotational driving force; and if a torque transmitted through said starting clutch exceeds a predetermined threshold, then a fuel being supplied to said engine is cut.

* * * * *